United States Patent
Hideshima

(10) Patent No.: US 11,235,391 B2
(45) Date of Patent: *Feb. 1, 2022

(54) DEVICE FOR MANUFACTURING THREE-DIMENSIONAL SHAPED OBJECT AND METHOD FOR MANUFACTURING THREE-DIMENSIONAL SHAPED OBJECT

(71) Applicant: Seiko Epson Corporation, Tokyo (JP)

(72) Inventor: Yasutoshi Hideshima, Matsumoto (JP)

(73) Assignee: Seiko Epson Corporation

( * ) Notice: Subject to any disclaimer, the term of this patent is extended or adjusted under 35 U.S.C. 154(b) by 173 days.

This patent is subject to a terminal disclaimer.

(21) Appl. No.: 16/658,251

(22) Filed: Oct. 21, 2019

(65) Prior Publication Data

US 2020/0122230 A1    Apr. 23, 2020

(30) Foreign Application Priority Data

Oct. 22, 2018  (JP) .............................. JP2018-198574

(51) Int. Cl.
| | |
|---|---|
| *B33Y 10/00* | (2015.01) |
| *B33Y 30/00* | (2015.01) |
| *B29C 64/165* | (2017.01) |
| *B29C 64/357* | (2017.01) |
| *B29C 64/188* | (2017.01) |

(Continued)

(52) U.S. Cl.
CPC ............ *B22F 10/10* (2021.01); *B29C 64/165* (2017.08); *B29C 64/188* (2017.08); *B29C 64/20* (2017.08); *B29C 64/218* (2017.08); *B29C 64/357* (2017.08); *B33Y 10/00* (2014.12);

(Continued)

(58) Field of Classification Search
CPC ... B29C 64/165; B29C 64/188; B29C 64/357; B29C 64/205; B29C 64/218; B29C 64/153; B28B 1/001; B22F 10/14; B22F 10/73; B22F 12/60; B22F 12/63; B33Y 10/00; B33Y 70/00
See application file for complete search history.

(56) References Cited

U.S. PATENT DOCUMENTS 5,387,380 A * 2/1995 Cima ........................ B41J 2/09
264/69
2013/0277891 A1  10/2013  Teulet
(Continued)

FOREIGN PATENT DOCUMENTS

| CN | 104550900 A | 4/2015 |
|---|---|---|
| CN | 105269814 A | 1/2016 |

(Continued)

*Primary Examiner* — Mary Lynn F Theisen
(74) *Attorney, Agent, or Firm* — Harness, Dickey & Pierce, P.L.C.

(57) ABSTRACT

A device for manufacturing a three-dimensional shaped object includes a table on which a layer of granulated powder is stacked, a layer formation portion that forms the granulated powder on the table into a layer having a predetermined thickness, a compression unit configured to compress the layer to crush the granulated powder in a formation region of a three-dimensional shaped object in the layer, and a binder applying unit that forms a shape of the three-dimensional shaped object by applying the binder to only a region corresponding to the surface region of the three-dimensional shaped object, in the formation region in the layer.

7 Claims, 7 Drawing Sheets

(51) Int. Cl.
*B29C 64/218* (2017.01)
*B22F 10/10* (2021.01)
*B33Y 40/00* (2020.01)
*B29C 64/20* (2017.01)
*B33Y 70/00* (2020.01)

(52) U.S. Cl.
CPC .............. *B33Y 30/00* (2014.12); *B33Y 40/00* (2014.12); *B33Y 70/00* (2014.12)

(56) References Cited

U.S. PATENT DOCUMENTS

| | | |
|---|---|---|
| 2015/0104346 A1 | 4/2015 | Nakamura et al. |
| 2017/0189960 A1 | 7/2017 | Ibe |
| 2017/0312822 A1 | 11/2017 | Kimblad |
| 2017/0312824 A1 | 11/2017 | Harrysson |
| 2018/0001559 A1 | 1/2018 | Paternoster et al. |
| 2018/0050491 A1* | 2/2018 | Ishihara ................. B33Y 70/00 |
| 2018/0147627 A1 | 5/2018 | Nakamura et al. |
| 2019/0084227 A1 | 3/2019 | Paternoster et al. |
| 2019/0111585 A1* | 4/2019 | Ma ..................... C04B 35/62695 |
| 2020/0198178 A1* | 6/2020 | Monroe ................ B28B 11/243 |

FOREIGN PATENT DOCUMENTS

| | | |
|---|---|---|
| CN | 107553900 A | 1/2018 |
| JP | 2015-096646 A | 5/2015 |
| JP | 2015-105201 A | 6/2015 |
| JP | 2017-127997 A | 7/2017 |
| JP | 6193493 B2 | 9/2017 |
| JP | 2017-214658 A | 12/2017 |
| JP | 2018-508650 A | 3/2018 |
| JP | 2018-508651 A | 3/2018 |
| JP | 2018-090841 A | 6/2018 |
| JP | 6339704 B2 | 6/2018 |
| WO | 2017/149014 A1 | 9/2017 |

\* cited by examiner

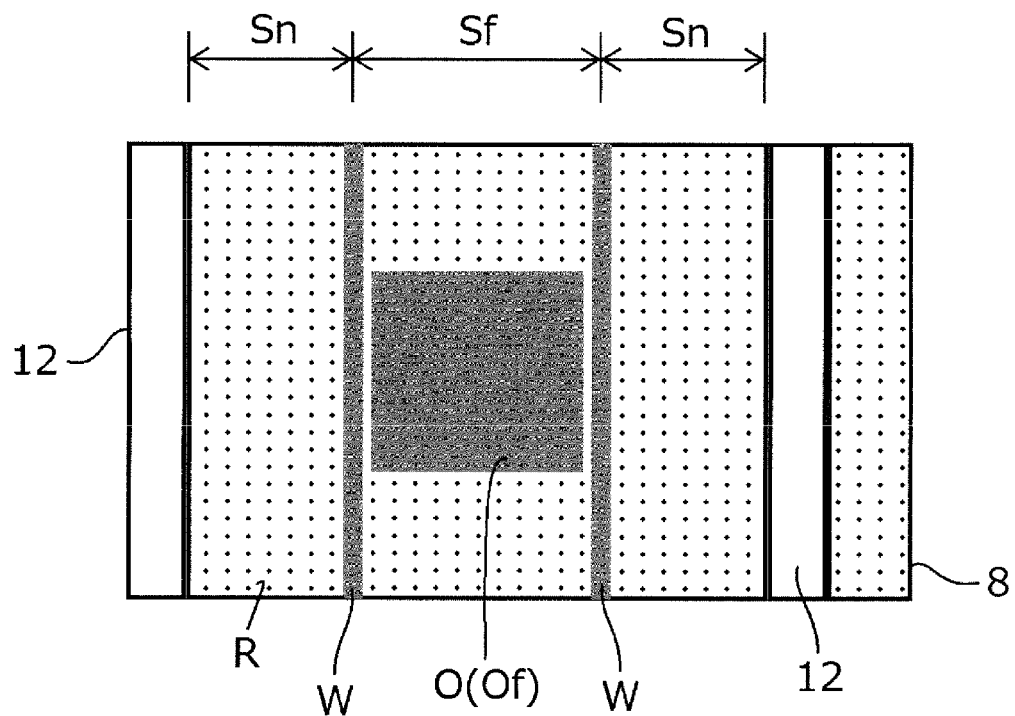
FIG. 7
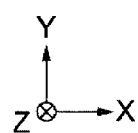

DEVICE FOR MANUFACTURING THREE-DIMENSIONAL SHAPED OBJECT AND METHOD FOR MANUFACTURING THREE-DIMENSIONAL SHAPED OBJECT

The present application is based on, and claims priority from, JP Application Serial Number 2018-198574, filed Oct. 22, 2018, the disclosure of which is hereby incorporated by reference herein in its entirety.

BACKGROUND

1. Technical Field

The present disclosure relates to a device for manufacturing a three-dimensional shaped object and a method for manufacturing the three-dimensional shaped object.

2. Related Art

In a related art, various methods of manufacturing a three-dimensional shaped object are used. Among them, there is a method for manufacturing in which a three-dimensional shaped object is manufactured by stacking a layer of configuration materials of a three-dimensional shaped object on a table.

For example, in JP-T-2018-508651, a method for manufacturing a three-dimensional shaped object is disclosed in which a first region is selectively bonded by stacking a layer of a particulate metal configuration material and depositing a binder on the first region surrounding a second region which remains unbound.

In JP-T-2018-508651, in a related method for manufacturing a three-dimensional shaped object in which a shape of a three-dimensional shaped object is formed by applying a binder to only a region corresponding to the surface region of the three-dimensional shaped object, depending on a type of the configuration material to be used, in some cases, sintering density may be lowered and sinterability may be reduced.

SUMMARY

A device for manufacturing a three-dimensional shaped object according to an aspect of the present disclosure includes: a table on which a layer of granulated powder is stacked; a layer formation portion that forms the granulated powder on the table into a layer having a predetermined thickness; a compression unit configured to compress the layer to crush the granulated powder in a formation region of a three-dimensional shaped object in the layer; and a binder applying unit that forms a shape of the three-dimensional shaped object by not applying a binder to a region not corresponding to a surface region of the three-dimensional shaped object and by applying the binder to a region corresponding to the surface region of the three-dimensional shaped object, in the formation region in the layer.

BRIEF DESCRIPTION OF THE DRAWINGS

FIG. 7 is a schematic planar sectional view illustrating a state of the device for manufacturing a three-dimensional shaped object when the method for manufacturing a three-dimensional shaped object is performed and the stacking of layers is completed.

DESCRIPTION OF EXEMPLARY EMBODIMENTS

Figure 1:
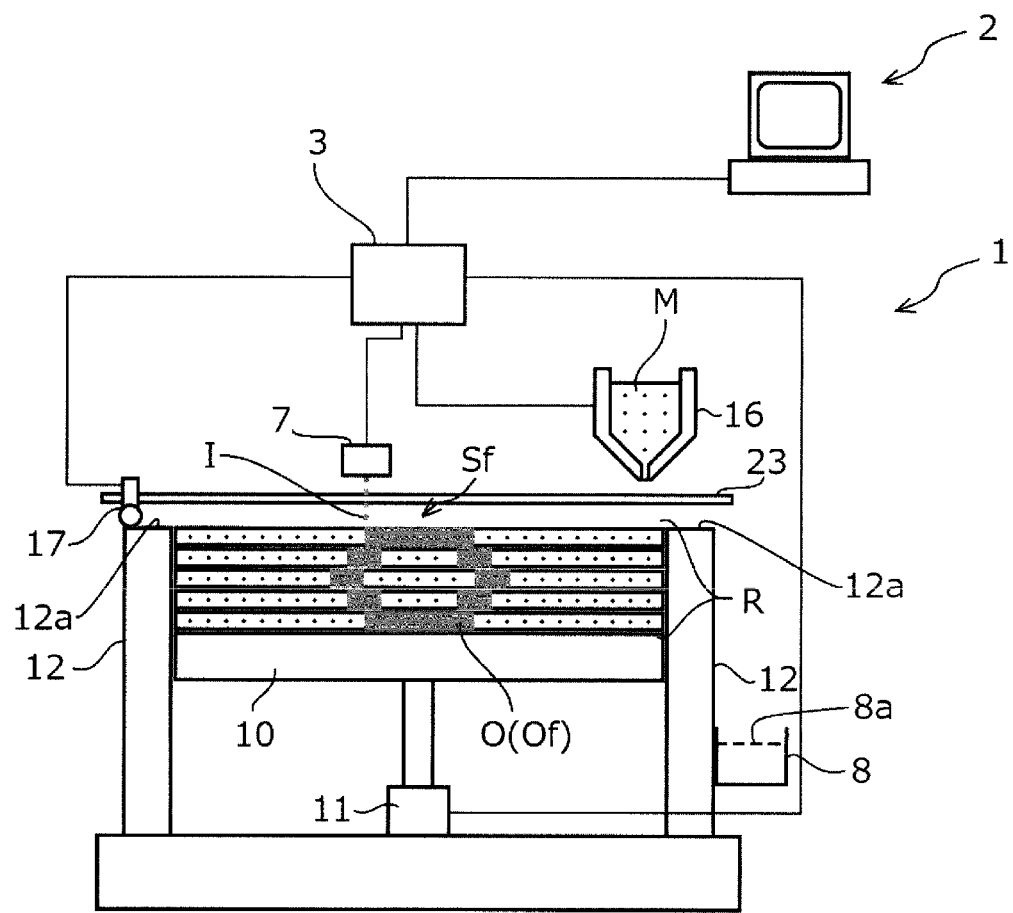
FIG. 1 is a schematic diagram illustrating a configuration of a device for manufacturing a three-dimensional shaped object according to an embodiment of the present disclosure.
Figure 1:
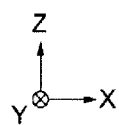

First, the present disclosure will be schematically described. A device for manufacturing a three-dimensional shaped object of a first aspect of the present disclosure includes: a table on which a layer of granulated powder is stacked; a layer formation portion that forms the granulated powder on the table into a layer having a predetermined thickness; a compression unit configured to compress the layer to crush the granulated powder in a formation region of a three-dimensional shaped object in the layer; and a binder applying unit that forms a shape of the three-dimensional shaped object by not applying a binder to a region not corresponding to a surface region of the three-dimensional shaped object and by applying the binder to a region corresponding to the surface region of the three-dimensional shaped object, in the formation region in the layer.

According to the configuration, it is possible to suppress that many configuration components of the binder remain inside the three-dimensional shaped object when sintering the three-dimensional shaped object by forming the shape of the three-dimensional shaped object by applying the binder to only a region corresponding to the surface region of the three-dimensional shaped object. In addition, since the granulated powder has fine particles and is formed bulky, it is possible to easily perform layer formation by using such bulky granulated powder, and it is possible to improve the sinterability when sintering the three-dimensional shaped object by using the granulated powder having such fine particles. The sinterability is improved when finer particles are used than when coarse particles are used.

A method for manufacturing a three-dimensional shaped object according to a second aspect of the present disclosure includes: a layer formation step of forming granulated powder into a layer having a predetermined thickness on a table on which a layer of the granulated powder is stacked; a compression step of compressing the layer to crush the granulated powder in a formation region of a three-dimensional shaped object in the layer; a binder application step of forming a shape of the three-dimensional shaped object by not applying a binder to a region not corresponding to a surface region of the three-dimensional shaped object and by applying the binder to a region corresponding to the surface region of the three-dimensional shaped object, in the formation region in the layer; and a sintering step of sintering the three-dimensional shaped object formed in the binder application step.

According to the configuration, it is possible to suppress that many configuration components of the binder remain inside the three-dimensional shaped object when sintering the three-dimensional shaped object by forming the shape of the three-dimensional shaped object by applying the binder to only a region corresponding to the surface region of the three-dimensional shaped object. In addition, since the granulated powder has fine particles and is formed bulky, it is possible to easily perform layer formation by using such bulky granulated powder, and it is possible to improve the sinterability when sintering the three-dimensional shaped object by using the granulated powder having such fine particles. The sinterability is improved when finer particles are used than when coarse particles are used.

The method for manufacturing a three-dimensional shaped object of a third aspect of the present disclosure is directed to the second aspect, in which, in the compression step, a first region is formed in which the granulated powder are crushed and the formation region is formed, and a second region is formed in which the granulated powder are not crushed, and the method further includes a recovery step of recovering the granulated powder in a second region.

According to the configuration, since the layer is compressed so as not to crush the granulated powder in the second region, and there is provided a recovering step of recovering the granulated powder in the second region, it is possible to reuse the granulated powder and it is possible to recover the granulated powder.

The method for manufacturing a three-dimensional shaped object of a fourth aspect of the present disclosure is directed to the third aspect, in which, in the layer formation step, the layer having a thickness of a first distance is formed by lowering the table interposed between wall portions facing each other, of which positions of top portions have the same height, to a first position below by the first distance from the position of the top portion, and moving a roller, which is movable in parallel with the table, at least from one of the top portions to the other, in the compression step, the first region is compressed by lowering the roller from the position of the top portion by a second distance and moving the roller over a range of the first region in parallel with the table or by raising the table to a second position above by the second distance from the first position and moving the roller over the range of the first region in parallel with the table, and in the recovery step, the granulated powder in the second region is recovered by disposing the table on the second position, and moving the roller at least from one of the top portions to the other.

According to the configuration, it is possible to consolidate the three-dimensional shaped object and it is possible to effectively reuse the granulated powder by a simple combination of the roller which can be moved in parallel with the table which can move up and down.

The method for manufacturing a three-dimensional shaped object of a fifth aspect of the present disclosure is directed to the third or fourth aspect, in which, in the binder application step, a wall is formed by applying the binder between the first region and the second region in the layer.

According to the configuration, since the wall is formed between the first region and the second region, it is possible to suppress the crushing of the granulated powder in the second region by transmitting force accompanying the compression of the first region to the second region. Therefore, it is possible to suppress that the granulated powder is crushed in the second region and the recovery efficiency of the granulated powder is reduced.

The method for manufacturing a three-dimensional shaped object of a sixth aspect of the present disclosure is directed to any one of the second to fifth aspects, in which the granulated powder includes polyvinyl alcohol.

According to the configuration, since the granulated powder includes polyvinyl alcohol, it is easy to be crushed by pressing or the like in the compression step, and it is possible to suppress dispersing of dust or the like when crushing.

The method for manufacturing a three-dimensional shaped object of a seventh aspect of the present disclosure is directed to anyone of the second to sixth aspects, the binder to be applied in the binder application step includes polyvinyl alcohol.

According to the configuration, by using polyvinyl alcohol, it is possible to perform the binder application step simply and inexpensively.

Hereinafter, with reference to the accompanying drawings, an embodiment according to the present disclosure will be described. First, an outline of a device for manufacturing a three-dimensional shaped object 1 according to an embodiment of the present disclosure will be described with reference to FIG. 1. Here, an X direction in the figure is a horizontal direction, a Y direction is a horizontal direction and a direction orthogonal to the X direction, and a Z direction is a vertical direction.

The device for manufacturing a three-dimensional shaped object 1 of the present embodiment includes a control unit 3 which is connected to a PC 2 and receives formation data from the PC 2. In addition, a table 10 in which a position of a top portion 12a is sandwiched by a wall portion 12 of the same height, a supply unit 16 that supplies a granulated powder M as a configuration material of a three-dimensional shaped object O on the top portion 12a or the table 10, a roller 17 that forms a layer R of the granulated powder M having a predetermined thickness by leveling the granulated powder M supplied to the table 10 disposed in a predetermined position, and a discharge unit 7 that forms a shape of the three-dimensional shaped object O by discharging a fluid I containing a binder to a formation region of the three-dimensional shaped object O in the layer R. Here, when the granulated powder M is supplied on the top portion 12a, the layer R is formed while the granulated powder M supplied on the top portion 12a is moved from the top portion 12a onto the table 10 by using the roller 17. In addition, on one side end portion of the wall portion 12 in the X direction, a recovery unit 8 which can recover the granulated powder M not used for formation of the three-dimensional shaped object O, is provided.

Here, the table 10 is configured to be movable along the Z direction which is a stacking direction by a table driving unit 11 connected to the control unit 3. In addition, the supply unit 16 is connected to the control unit 3 and is configured to be movable in a horizontal direction intersecting the Z direction. In addition, the roller 17 is configured to extend in the Y direction, is connected to the control unit 3, and is configured to be movable along the X direction along a guide rail 23 extending in the X direction. In addition, the guide rail 23 is configured to be movable along the Z direction. Since the guide rail 23 has such a configuration, the roller 17 is also movable along the Z direction as along with the movement of the guide rail 23.

The device for manufacturing a three-dimensional shaped object 1 of the present embodiment is the device for manufacturing a three-dimensional shaped object which manufactures the three-dimensional shaped object O by stacking the layer R, by such a configuration. In addition, the roller 5 serves as a layer formation portion for leveling the granulated powder M placed on the top portion 12a or the table 10 to a predetermined thickness by moving along the X direction from the top portion 12a on one side to the top portion 12a on the other side, and serves as a compression unit which can compress at least the formation region of the three-dimensional shaped object O in the layer R. However, the layer formation portion and the compression unit are configured separately, for example, the layer formation portion is configured by a squeegee or the like and the compression unit is configured by a roller or the like.

Here, once summarized, the device for manufacturing a three-dimensional shaped object 1 of the present embodiment includes the supply unit 16 of the granulated powder M and the table 10 in which the granulated powder M supplied from the supply unit 16 is placed. In addition, there is provided the roller 17 that serves as the layer formation portion for forming the granulated powder M placed on the table 10 to the layer R of a predetermined thickness, and serves as the compression unit which can compress the formation region of the three-dimensional shaped object O in the layer R. In addition, there is provided the discharge unit 7 serving as a binder applying unit which forms the shape of the three-dimensional shaped object O by applying a binder to the formation region in the layer R. Here, as described above, a supply destination of the granulated powder M from the supply unit 16 may be a portion on the table 10 or and a portion on the top portion 12a.

Here, as illustrated in FIG. 1, under the control of the control unit 3, in the first region Sf of the layer R, the discharge unit 7 applies no binder to a region not corresponding to the surface region Of of the three-dimensional shaped object O and applies the binder to a region corresponding to the surface region Of of the three-dimensional shaped object O, that is, applies the binder to only the region corresponding to the surface region Of of the three-dimensional shaped object O, and thus, an external shape of the three-dimensional shaped object O can be formed. The three-dimensional shaped object O formed by applying the binder by the discharge unit 7 can be sintered by an external sintering device.

In the device for manufacturing a three-dimensional shaped object 1 of the present embodiment, it is configured to be able to suppress that many configuration components of the binder remain inside the three-dimensional shaped object O when sintering the three-dimensional shaped object O by forming the shape of the three-dimensional shaped object O by applying the binder to only the region corresponding to the surface region Of of the three-dimensional shaped object O. In addition, since the granulated powder M has fine particles and is formed bulky, it is possible to easily perform layer formation by using the bulky granulated powder M in this manner, and it is possible to improve the sinterability when sintering the three-dimensional shaped object O by using the granulated powder M having such fine particles. The sinterability is improved when finer particles are used than when coarse particles are used. Furthermore, since the granulated powder M is crushed to form the three-dimensional shaped object O after layer formation is easily performed by using the bulky granulated powder M, it is possible to suppress generation of voids in the three-dimensional shaped object O.

Since the device for manufacturing a three-dimensional shaped object 1 of the present embodiment does not include the sintering device, it is necessary to perform sintering with an external sintering device or the like when sintering. In other representation, the device for manufacturing a three-dimensional shaped object 1 of the present embodiment configures a manufacturing system of the three-dimensional shaped object with the external sintering device. However, it goes without saying that the device may be used as the device for manufacturing a three-dimensional shaped object including a sintered unit which can sinter the three-dimensional shaped object O formed by applying the binder by the discharge unit 7.

Details will be described below by using FIG. 2 to FIG. 7. In the control unit 3 of the device for manufacturing a three-dimensional shaped object 1 of the present embodiment, the granulated powder M is crushed in the first region Sf in the layer R, and the granulated powder M is not crushed in the second region Sn in which the formation region in the layer R is not formed, and thus, it is possible to control the roller 17 as the compression unit.

The granulated powder M is formed by putting together a plurality of fine particles such as metal and ceramic with the binder such as polyvinyl alcohol, is easily crushed by pressing or the like, and a bulky particle which is less likely to disperse dust or the like when crushing or the like. The granulated powder M is not particularly limited, but those which can be crushed by the weight of 1 MPa or less and are processed into substantially spherical particles having the diameter of 50 μm by a plurality of metal fine particles having an average particle diameter of approximately 5 μm, can be preferably used. By using the bulky granulated powder M in this manner, the device for manufacturing a three-dimensional shaped object 1 of the present embodiment can suppress the non-uniformity of a layer thickness and the non-uniformity of the density in a film thickness direction which occur when forming a layer by using the plurality of fine particles. In addition, scattering of the plurality of fine particles can also be suppressed, and the layer R can be stably formed. In addition, by compressing the layer R to crush the granulated powder M in the first region Sf and not to crush the granulated powder M in the second region Sn, that is, by crushing the granulated powder M in the first region Sf, the three-dimensional shaped object O can be consolidated with fine particles, and by not crushing the granulated powder M in the second region Sn, the granulated powder M of the second region Sn can be reused. Here, the crush means that it becomes a state of a layer in which it is flatly crushed by pressing, the granulated powder M processed into particles is compressed into a flat shape, and a plurality of the granulated powders M in the flat shape are continuously connected to each other.

In addition, as described above, the device for manufacturing a three-dimensional shaped object 1 of the present embodiment includes the recovery unit 8, and is configured to be able to recover the granulated powder M not used for the formation of the three-dimensional shaped object O and not crushed with the manufacture of the three-dimensional shaped object such as the granulated powder M in the second region Sn. Therefore, since the device for manufacturing a three-dimensional shaped object 1 of the present embodiment can collect the granulated powder M which can be reused as it is such as the granulated powder M in the second region Sn, the device is configured to be able to easily collect the granulated powder M which can be reused. The recovery unit 8 of the present embodiment includes a removable sieve 8a as illustrated in FIG. 1, and is configured to easily divide the crushed granulated powder M and the granulated powder M not crushed, by attaching the sieve 8a having holes finer than the particle diameter of the granulated powder M.

Next, the method for manufacturing a three-dimensional shaped object performed by using the device for manufacturing a three-dimensional shaped object 1 of the present embodiment, that is, specific control of the control unit 3 will be described by using the flowchart of FIG. 2, and FIG. 3 to FIG. 7. In FIG. 3 to FIG. 7, states in which the sieve 8a is removed are illustrated.

Figure 2:
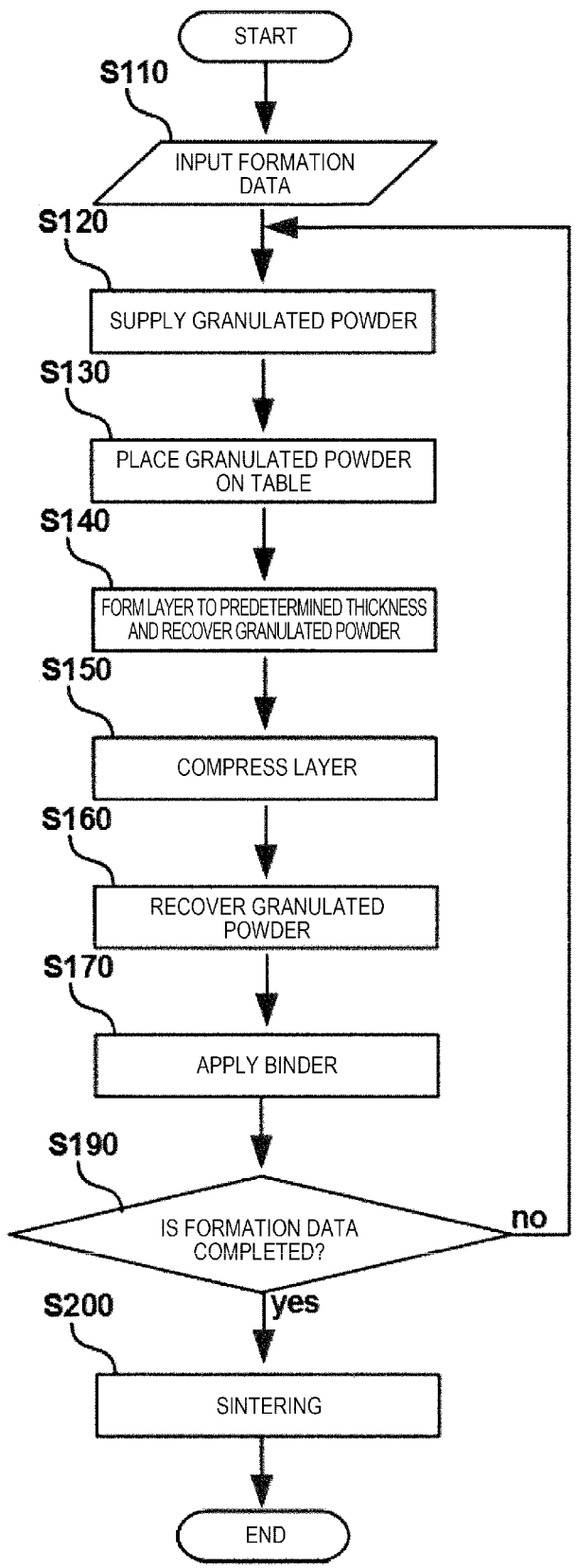
FIG. 2 is a flowchart of a method for manufacturing a three-dimensional shaped object performed by using the device for manufacturing a three-dimensional shaped object according to the embodiment of the present disclosure.

In the method for manufacturing a three-dimensional shaped object of the present embodiment, first, as illustrated in a flowchart of FIG. 2, in step S110, the formation data of the three-dimensional shaped object O to be manufactured is input. An input source of the formation data of the three-dimensional shaped object O is not particularly limited, but the formation data can be input to the device for manufacturing a three-dimensional shaped object 1 by using the PC 2 or the like.

Next, in step S120, the supply of the configuration material starts by supplying the granulated powder M which is the configuration material of the three-dimensional shaped object O from the supply unit 16.

Next, in step S130, the granulated powder M supplied from the supply unit 16 is placed on the table 10. When performing this step, the table 10 is height-adjusted to a first position, which is a desired position in the Z direction, so that the layer R having a desired thickness can be formed. Specifically, in the present embodiment, the height from the mounting surface of the granulated powder M on the table 10 to the top portion 12a of the wall portion 12 is 100 μm.

Figure 3:
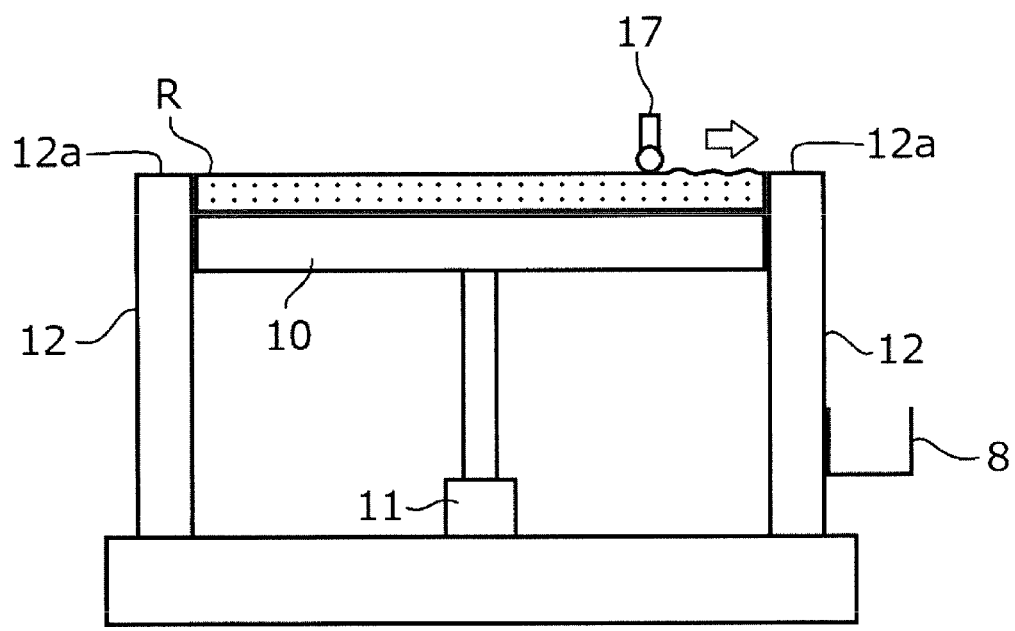
FIG. 3 is a schematic side sectional view illustrating a state of the device for manufacturing a three-dimensional shaped object in a layer formation step when performing the method for manufacturing a three-dimensional shaped object.
Figure 3:
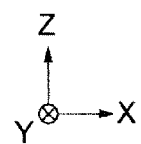

Next, in step S140, by moving the roller 17 along the X direction from the top portion 12a on one side to the top portion 12a on the other side as represented by an arrow in FIG. 3, the granulated powder M placed on the table 10 is leveled to a predetermined thickness as represented in FIG. 3. The present step S140 corresponds to a layer formation step of processing the layer R to a predetermined thickness. Furthermore, the present step S140 also corresponds to a recovery step of recovering the granulated powder M unnecessary for the formation of the three-dimensional shaped object O in the recovery unit 8. The granulated powder M recovered in the present step S140 is not compressed and can be reused as it is. The granulated powder M placed on the top portion 12a may be leveled to a predetermined thickness.

Figure 4:
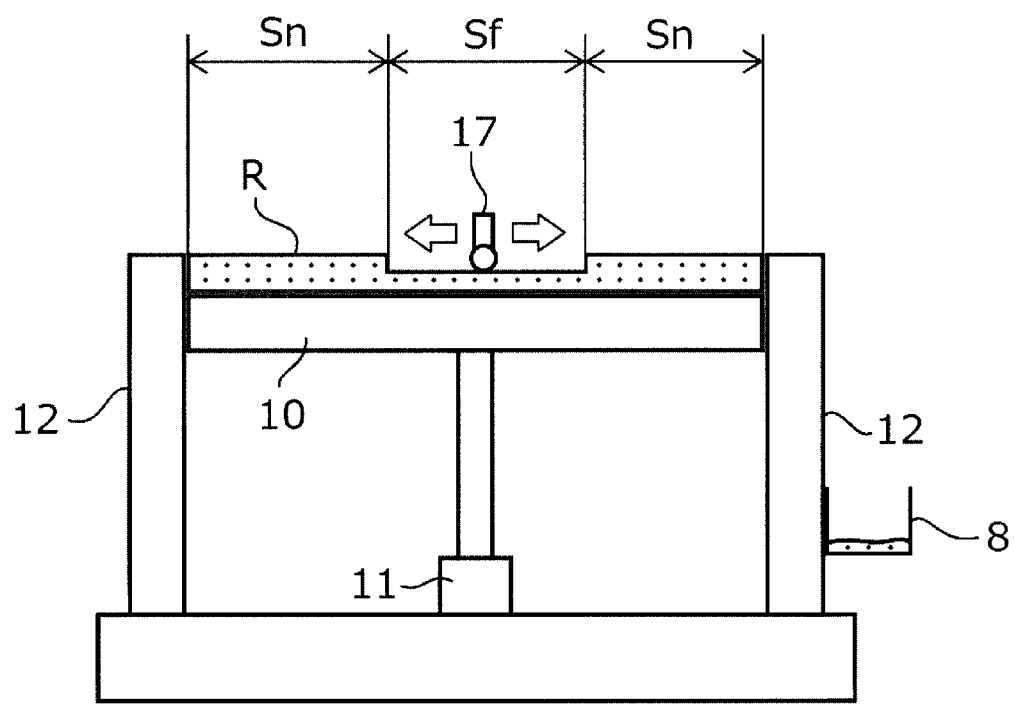
FIG. 4 is a schematic side sectional view illustrating a state of the device for manufacturing a three-dimensional shaped object in a compression step when performing the method for manufacturing a three-dimensional shaped object.

Next, in step S150, as illustrated in FIG. 4, the position of the roller 17 in the Z direction is lowered, and by reciprocating the roller 17 in the first region Sf that includes the formation region along the X direction, the first region Sf in the layer R is compressed. Here, specifically, in the present embodiment, the distance for lowering the roller 17 is 50 μm. In the present embodiment, in order to compress the first region Sf in the layer R, the position of the roller 17 in the Z direction is lowered, but instead of lowering the position of the roller 17 in the Z direction, the position of the table 10 in the Z direction may be raised to a second position that is 50 μm higher than the first position.

Figure 5:
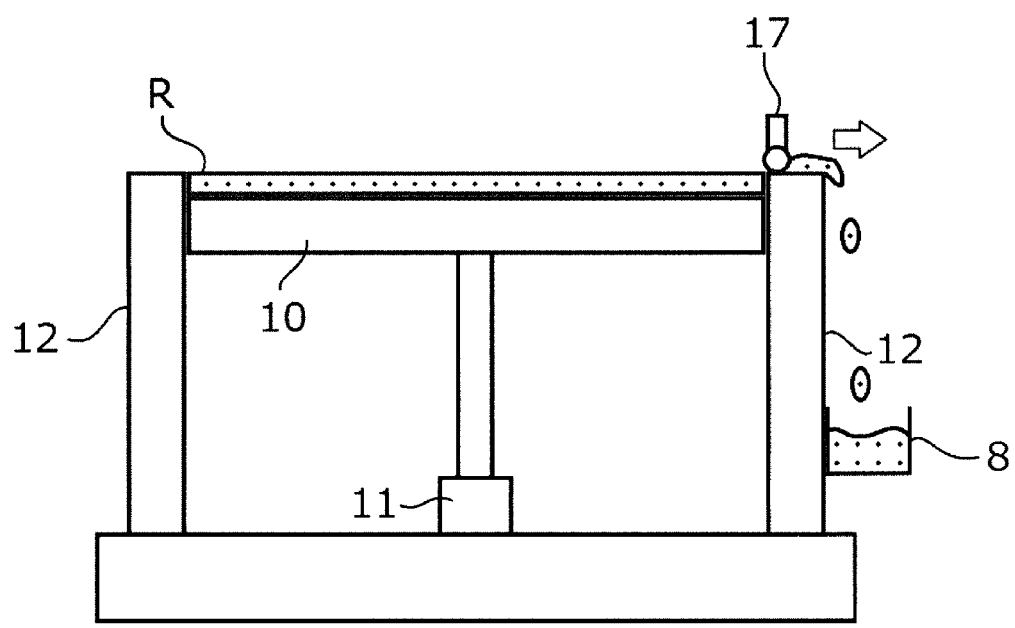
FIG. 5 is a schematic side sectional view illustrating a state of the device for manufacturing a three-dimensional shaped object in a recovery step when performing the method for manufacturing a three-dimensional shaped object.
Figure 5:
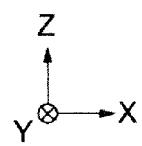

Next, in step S160, as illustrated in FIG. 5, by raising the position of the table 10 in the Z direction to the second position and moving the roller 17 along the X direction, the granulated powder M placed on the second region Sn where the three-dimensional shaped object O is not formed is recovered in the recovery unit 8. Here, specifically, in the present embodiment, the distance for raising the table 10 is 50 μm. That is, the thickness of the layer R is 50 μm for both the first region Sf and the second region Sn, the granulated powder M compressed is placed on the table 10 in the first region Sf, and the granulated powder M not compressed is placed on the table 10 in the second region Sn.

Next, in step S170, the fluid I including the binder is discharged from the discharge unit 7 to a position which forms the shape of the three-dimensional shaped object O based on the formation data input in step S110 and a boundary position between the first region Sf and the second region Sn. Here, in the present step S170, as a position which forms the shape of the three-dimensional shaped object O, in the first region Sf in the layer R, the shape of the three-dimensional shaped object O is formed by applying the binder to only the region corresponding to the surface region of the three-dimensional shaped object O.

Figure 6:
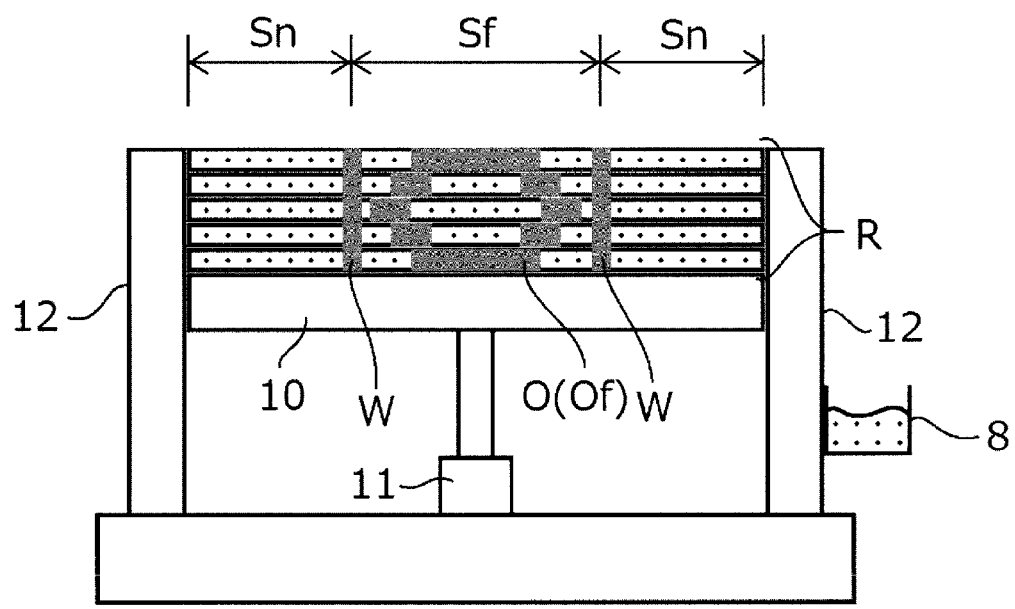
FIG. 6 is a schematic side sectional view illustrating a state of the device for manufacturing a three-dimensional shaped object when the method for manufacturing a three-dimensional shaped object is performed and stacking of layers is completed.

In step S190, it is determined whether or not the formation of the layer R based on the formation data input in step S110, is completed. When it is determined that the formation of the layer R is not completed, that is, when it is determined that the layer R is furthermore stacked, the process returns to step S120 and the next layer R is formed. Meanwhile, when it is determined that the formation of the layer R is completed, the process proceeds to step S200. FIG. 6 represents a state in which steps from step S120 to step S190 are repeated five times. As illustrated in FIG. 6, the three-dimensional shaped object O formed on the table 10 is formed by applying the binder to only the region corresponding to the surface region Of of the three-dimensional shaped object O.

In step S200, a green body formed by repeating steps from step S120 to step S190 by a desired number of times, for example, a green body of the three-dimensional shaped object O as illustrated in FIG. 6, is sintered by the sintering device or the like. Therefore, at the completion of the present step, the method of manufacturing a three-dimensional shaped object of the present embodiment is completed.

As described above, the method for manufacturing a three-dimensional shaped object of the present embodiment includes a supply step of the granulated powder M corresponding to step S120, a placing step corresponding to step S130 in which the granulated powder M supplied in the supply step is placed on the table 10, a layer formation step corresponding to step S140 in which the granulated powder M placed on the table 10 is formed into the layer R having a predetermined thickness, a compression step corresponding to step S150 in which the layer R is compressed to crush the granulated powder M in the first region Sf in the layer R, a binder application step corresponding to step S170 in which the shape of the three-dimensional shaped object is formed by not applying the binder to a region not corresponding to the surface region Of of the three-dimensional shaped object O and by applying the binder to the region corresponding to the surface region Of of the three-dimensional shaped object O, that is, by applying the binder to only the region corresponding to the surface region Of of the three-dimensional shaped object O, in the formation region in the layer R, and a sintering step of sintering the three-dimensional shaped object formed in the binder application step, which corresponds to step S200.

By performing the method for manufacturing a three-dimensional shaped object of the present embodiment, it is possible to suppress that many configuration components of the binder remain inside the three-dimensional shaped object O when the three-dimensional shaped object O is sintered by forming the shape of the three-dimensional shaped object O by applying the binder to only the region corresponding to the surface region Of of the three-dimensional shaped object O. In addition, since the granulated powder M has fine particles and is formed bulky, it is possible to easily perform the layer formation by using the bulky granulated powder M in this manner and it is possible to improve the sinterability when sintering the three-dimensional shaped object O by using the bulky granulated powder M having such fine particles. The sinterability is improved when finer particles are used than when coarse particles are used. Furthermore, since the granulated powder M is crushed to form the three-dimensional shaped object O after layer formation is easily performed by using the bulky granulated powder M, it is possible to suppress generation of voids in the three-dimensional shaped object O.

In addition, in the compression step in the method for manufacturing a three-dimensional shaped object of the present embodiment the layer R is compressed so as not to crush the granulated powder M in the second region Sn of the layer R in which the three-dimensional shaped object O is not formed and there is provided a recovery step of recovering the granulated powder M in the second region Sn. Therefore, the granulated powder M which can be reused can be recovered and reused.

In the method for manufacturing a three-dimensional shaped object of the present embodiment, in the layer formation step in step S120, by lowering the table 10 interposed between the wall portions 12 corresponding to the same height as a position of the top portion 12a, from the position of the top portion 12a to the first position which is a first distance lowered by 100 μm, and moving the roller 17 which can be moved in parallel with the table 10 at least from one of the top portion 12a to the other, the layer R having a thickness corresponding to the first distance, that is, having the thickness of 100 μm is formed. Accordingly, in the compression step of step S150, the first region Sf is compressed by lowering the roller 17 from the position of the top portion 12a to 50 μm which is a second distance without changing the position of the table 10 in the Z direction, and by moving a range of the first region Sf in parallel with the table 10. In the compression step, the roller 17 may be moved over the range of the first region Sf in parallel with the table 10 by raising the table 10 from the first position to the second position by the second distance without changing the position of the roller 17 in the Z direction. Accordingly, in the recovery step of step S160, the granulated powder M in the second region Sn is recovered by disposing the table 10 at the second position raised from the first position by 50 μm, and by moving the roller 17 at least from one of the top portion 12a to the other. That is, by performing the method for manufacturing a three-dimensional shaped object of the present embodiment, it is possible to consolidate the three-dimensional shaped object O, and it is possible to effectively reuse the granulated powder M by a simple combination of the roller 17 which can be moved in parallel with the table 10 which can move up and down. Here, the "parallel" is not limited to parallel in a strict sense, and means that it may be substantially parallel.

In addition, in the method for manufacturing a three-dimensional shaped object of the present embodiment, as illustrated in FIG. 6 and FIG. 7, in a processing step of step S170, a wall W is formed between the first region Sf and the second region Sn in the layer R. Therefore, it is possible to suppress the crushing of the granulated powder M in the second region Sn by transmitting force accompanying the compression to the second region Sn as the first region Sf is compressed. Therefore, it is possible to suppress that the granulated powder M is crushed in the second region Sn and the recovery efficiency of the granulated powder is reduced. In the method for manufacturing a three-dimensional shaped object of the present embodiment, since the wall W is formed in the processing step after the compression step, the method can suppress that the granulated powder M in the second region Sn is crushed in the layer R of a lower layer stacked. However, the wall W may be formed before the compression step in order to suppress the crushing of the granulated powder M in the second region Sn in the layer R during the stacking.

As described above, the granulated powder M used in the method for manufacturing a three-dimensional shaped object of the present embodiment contains polyvinyl alcohol as the binder for holding metal particles, but, in the method for manufacturing a three-dimensional shaped object of the present embodiment, the binder applied in the binder application step also contains the polyvinyl alcohol. By using polyvinyl alcohol, it is possible to perform the binder application step simply and inexpensively.

In addition, in the method for manufacturing a three-dimensional shaped object of the present embodiment, as the granulated powder M to be used, those containing the metal particles and the binder may be preferably used. As the binder, it is possible to preferably use, for example, inorganic bentonite, natural organic waste molasses, lignin sulfonate, starch, konjac powder, sodium alginate, synthetic organic carboxymethyl cellulose, and polyacrylamide other than polyvinyl alcohol, polyethylene, polypropylene and polyacetal. In addition, the binder can also be used as the binder applied in the binder application step.

The present disclosure is not limited to the embodiments described above, and can be realized in various configurations without departing from the scope of the disclosure. The technical features in the embodiments corresponding to the technical features in the respective forms described in the section of the summary of the disclosure can be replaced or combined as appropriate to solve some or all of the problems described above, or to achieve the whole or a part of the effects described above. In addition, if the technical feature is not described as essential in the present specification, it can be deleted as appropriate.

What is claimed is:

1. A device for manufacturing a three-dimensional shaped object comprising:
   a table having a surface configured for receipt of a granulated powder;
   a leveling device that is configured to a level the granulated powder positioned on the surface of the table into a layer having a predetermined thickness;
   a roller configured to compress the layer such that the predetermined thickness is reduced to a lesser thickness that is located in a formation region of a three-dimensional shaped object in the layer; and
   a binder applying unit that forms, in the formation region in the layer, a shape of the three-dimensional shaped object by not applying a binder to a region not corresponding to a surface region of the three-dimensional shaped object and by applying the binder to a region corresponding to the surface region of the three-dimensional shaped object.

2. A method for manufacturing a three-dimensional shaped object comprising:
   depositing a granulated powder onto a table;
   leveling the granulated powder on the table into a layer having a predetermined thickness;
   compressing the layer having the predetermined thickness to a lesser thickness that crushes the granulated powder in a formation region of a three-dimensional shaped object in the layer;
   forming a shape of the three-dimensional shaped object by not applying a binder to a region not corresponding to a surface region of the three-dimensional shaped object and by applying the binder to a region corresponding to the surface region of the three-dimensional shaped object, in the formation region in the layer; and
a sintering step of sintering the three-dimensional shaped object formed in the binder application step.

3. The method for manufacturing a three-dimensional shaped object according to claim 2,
further comprising recovering the granulated powder in a second region that is formed in which the granulated powder is not crushed,
wherein in the compressing, a first region is formed in which the granulated powder is crushed and the formation region is formed, and the second region is formed in which the granulated powder is not crushed.

4. The method for manufacturing a three-dimensional shaped object according to claim 3,
wherein, in the leveling, layer having a thickness of a first distance is formed by lowering the table interposed between wall portions facing each other, of which positions of top portions have the same height, to a first position below by the first distance from the position of the top portion, and moving a roller, which is movable in parallel with the table, at least from one of the top portions to the other,
in the compressing, the first region is compressed by lowering the roller from the position of the top portion by a second distance and moving the roller over a range of the first region in parallel with the table or by raising the table to a second position above by the second distance from the first position and moving the roller over the range of the first region in parallel with the table, and
in the recovering, the granulated powder in the second region is recovered by disposing the table on the second position, and moving the roller at least from one of the top portions to the other.

5. The method for manufacturing a three-dimensional shaped object according to claim 3,
wherein, in the forming the shape of the three-dimensional shaped object, a wall is formed by applying the binder between the first region and the second region in the layer.

6. The method for manufacturing a three-dimensional shaped object according to claim 2,
wherein the granulated powder includes polyvinyl alcohol.

7. The method for manufacturing a three-dimensional shaped object according to claim 2,
wherein the binder to be applied in the forming the shape of the three-dimensional shaped object includes polyvinyl alcohol.

* * * * *